(12) United States Patent
Nie et al.

(10) Patent No.: US 8,902,535 B1
(45) Date of Patent: Dec. 2, 2014

(54) DISK DRIVE ADAPTING FEED-FORWARD COMPENSATION USING ITERATIVE LEARNING CONTROL OVER SEGMENTS OF SEEK LENGTH

(71) Applicant: Western Digital Technologies, Inc., Irvine, CA (US)

(72) Inventors: Jianbin Nie, San Jose, CA (US); Edgar D. Sheh, San Jose, CA (US); Siri S. Weerasooriya, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/712,837

(22) Filed: Dec. 12, 2012

(51) Int. Cl.
*G11B 5/54* (2006.01)
*G11B 5/55* (2006.01)

(52) U.S. Cl.
CPC ..................... *G11B 5/5534* (2013.01)
USPC .......... 360/75; 360/77.01; 360/77.08; 360/55

(58) Field of Classification Search
CPC ...... G11B 5/54; G11B 5/5547; G11B 5/5552; G11B 5/5556; G11B 5/556; G11B 5/56; G11B 5/58; G11B 5/5526; G11B 5/59633; G11B 5/596; G11B 5/5965; G11B 5/59666
USPC ......... 360/55, 75, 77.01, 77.05, 77.08, 77.11, 360/78.14
See application file for complete search history.

(56) References Cited

U.S. PATENT DOCUMENTS

| | | |
|---|---|---|
| 5,668,679 A | 9/1997 | Swearingen et al. |
| 5,754,352 A | 5/1998 | Behrens et al. |
| 6,005,727 A | 12/1999 | Behrens et al. |
| 6,021,012 A | 2/2000 | Bang |
| 6,091,564 A | 7/2000 | Codilian et al. |
| 6,169,382 B1 * | 1/2001 | McKenzie et al. ............ 318/561 |
| 6,191,906 B1 | 2/2001 | Buch |
| 6,292,318 B1 | 9/2001 | Hayashi |
| 6,304,407 B1 | 10/2001 | Baker et al. |
| 6,411,453 B1 | 6/2002 | Chainer et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,614,615 B1 * | 9/2003 | Ju et al. ...................... 360/78.04 |
| 6,636,377 B1 | 10/2003 | Yu et al. |
| 6,690,536 B1 | 2/2004 | Ryan |
| 6,704,156 B1 | 3/2004 | Baker et al. |
| 6,738,205 B1 | 5/2004 | Moran et al. |
| 6,795,268 B1 | 9/2004 | Ryan |
| 6,920,004 B1 | 7/2005 | Codilian et al. |
| 6,924,960 B1 | 8/2005 | Melkote et al. |
| 6,937,420 B1 | 8/2005 | McNab et al. |
| 6,943,978 B1 | 9/2005 | Lee |
| 6,967,799 B1 | 11/2005 | Lee |

(Continued)

*Primary Examiner* — Thomas Alunkal

(57) ABSTRACT

A disk drive is disclosed comprising a head actuated over a disk comprising servo information. A position error signal is generated while executing a first plurality of seek operations to seek the head over a seek length, and first feed-forward compensation values are adapted for a first segment of the seek length using an iterative learning control algorithm based on the position error signal. During a second plurality of seeks, second feed-forward compensation values are adapted for a second segment of the seek length using the iterative learning control algorithm based on the position error signal. The servo control system is operable to execute the second plurality of seek operations using the first feed-forward compensation generated for the first segment of the seek length.

20 Claims, 5 Drawing Sheets

(56) References Cited

U.S. PATENT DOCUMENTS

| | | | | |
|---|---|---|---|---|
| 6,977,789 | B1 | 12/2005 | Cloke | |
| 6,985,316 | B1 * | 1/2006 | Liikanen et al. | 360/29 |
| 6,987,636 | B1 | 1/2006 | Chue et al. | |
| 6,989,954 | B1 | 1/2006 | Lee et al. | |
| 6,992,848 | B1 | 1/2006 | Agarwal et al. | |
| 7,002,761 | B1 | 2/2006 | Sutardja et al. | |
| 7,019,937 | B1 | 3/2006 | Liikanen et al. | |
| 7,068,459 | B1 * | 6/2006 | Cloke et al. | 360/75 |
| 7,068,463 | B1 | 6/2006 | Ji et al. | |
| 7,088,533 | B1 | 8/2006 | Shepherd et al. | |
| 7,136,253 | B1 | 11/2006 | Liikanen et al. | |
| 7,145,744 | B1 | 12/2006 | Clawson et al. | |
| 7,212,364 | B1 | 5/2007 | Lee | |
| 7,230,786 | B1 | 6/2007 | Ray et al. | |
| 7,248,426 | B1 | 7/2007 | Weerasooriya et al. | |
| 7,256,956 | B2 | 8/2007 | Ehrlich | |
| 7,283,321 | B1 * | 10/2007 | Sun et al. | 360/78.05 |
| 7,333,280 | B1 | 2/2008 | Lifchits et al. | |
| 7,333,286 | B2 | 2/2008 | Jung et al. | |
| 7,382,564 | B1 | 6/2008 | Everett et al. | |
| 7,391,583 | B1 | 6/2008 | Sheh et al. | |
| 7,391,584 | B1 | 6/2008 | Sheh et al. | |
| 7,405,897 | B2 | 7/2008 | Dougherty et al. | |
| 7,411,758 | B1 | 8/2008 | Cheung et al. | |
| 7,414,809 | B2 | 8/2008 | Smith et al. | |
| 7,477,471 | B1 | 1/2009 | Nemshick et al. | |
| 7,486,470 | B1 * | 2/2009 | Semba | 360/77.01 |
| 7,495,857 | B1 | 2/2009 | Bennett | |
| 7,522,370 | B1 | 4/2009 | Sutardja | |
| 7,529,055 | B1 | 5/2009 | Laks et al. | |
| 7,551,387 | B2 | 6/2009 | Sun et al. | |
| 7,561,361 | B1 | 7/2009 | Rutherford | |
| 7,619,846 | B2 | 11/2009 | Shepherd et al. | |
| 7,623,313 | B1 | 11/2009 | Liikanen et al. | |
| 7,626,782 | B1 * | 12/2009 | Yu et al. | 360/78.04 |
| 7,633,704 | B2 * | 12/2009 | Supino et al. | 360/75 |
| 7,639,445 | B2 | 12/2009 | Matsunaga et al. | |
| 7,639,446 | B2 | 12/2009 | Mizukoshi et al. | |
| 7,656,604 | B1 | 2/2010 | Liang et al. | |
| 7,675,705 | B2 | 3/2010 | Mizukoshi et al. | |
| 7,688,534 | B1 | 3/2010 | McCornack | |
| 7,715,143 | B2 | 5/2010 | Bliss et al. | |
| 7,728,539 | B2 | 6/2010 | Smith et al. | |
| 7,733,588 | B1 | 6/2010 | Ying | |
| 7,737,793 | B1 | 6/2010 | Ying et al. | |
| 7,751,144 | B1 | 7/2010 | Sutardja | |
| 7,787,211 | B2 | 8/2010 | Kim et al. | |
| 7,800,857 | B1 | 9/2010 | Calaway et al. | |
| 7,839,591 | B1 | 11/2010 | Weerasooriya et al. | |
| 7,852,598 | B1 | 12/2010 | Sutardja | |
| 7,876,522 | B1 | 1/2011 | Calaway et al. | |
| 7,881,004 | B2 | 2/2011 | Kumbla et al. | |
| 7,881,005 | B1 | 2/2011 | Cheung et al. | |
| 2002/0041472 | A1 * | 4/2002 | Ding et al. | 360/290 |
| 2006/0103967 | A1 * | 5/2006 | Kim et al. | 360/75 |
| 2006/0171059 | A1 | 8/2006 | Chan et al. | |
| 2007/0070538 | A1 | 3/2007 | Lau et al. | |
| 2007/0076314 | A1 | 4/2007 | Rigney | |
| 2007/0211367 | A1 | 9/2007 | Lau et al. | |
| 2007/0291401 | A1 | 12/2007 | Sun et al. | |
| 2009/0086357 | A1 | 4/2009 | Ehrlich | |

* cited by examiner

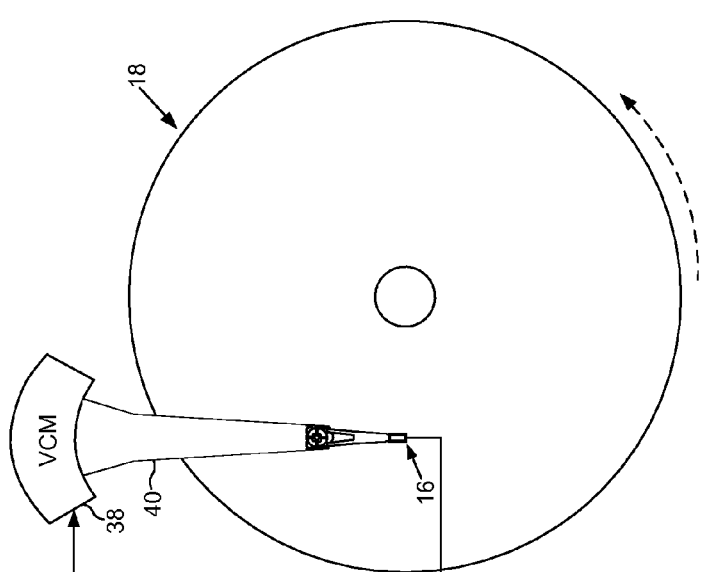
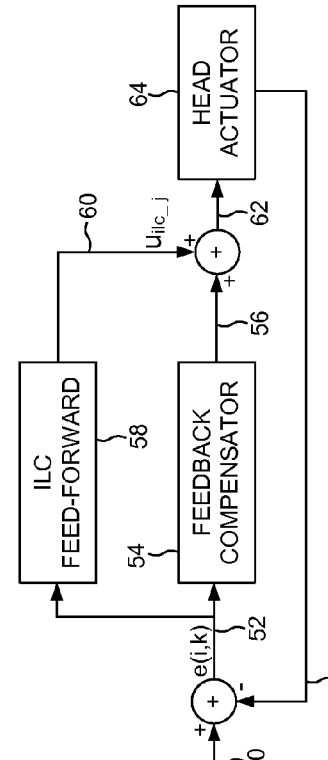
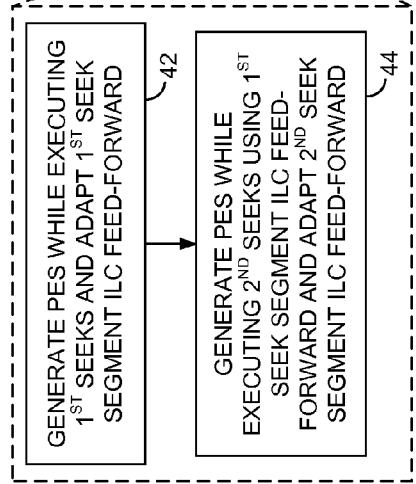
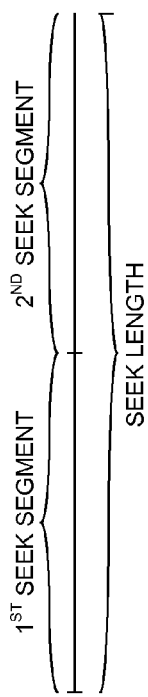

FIG. 3A
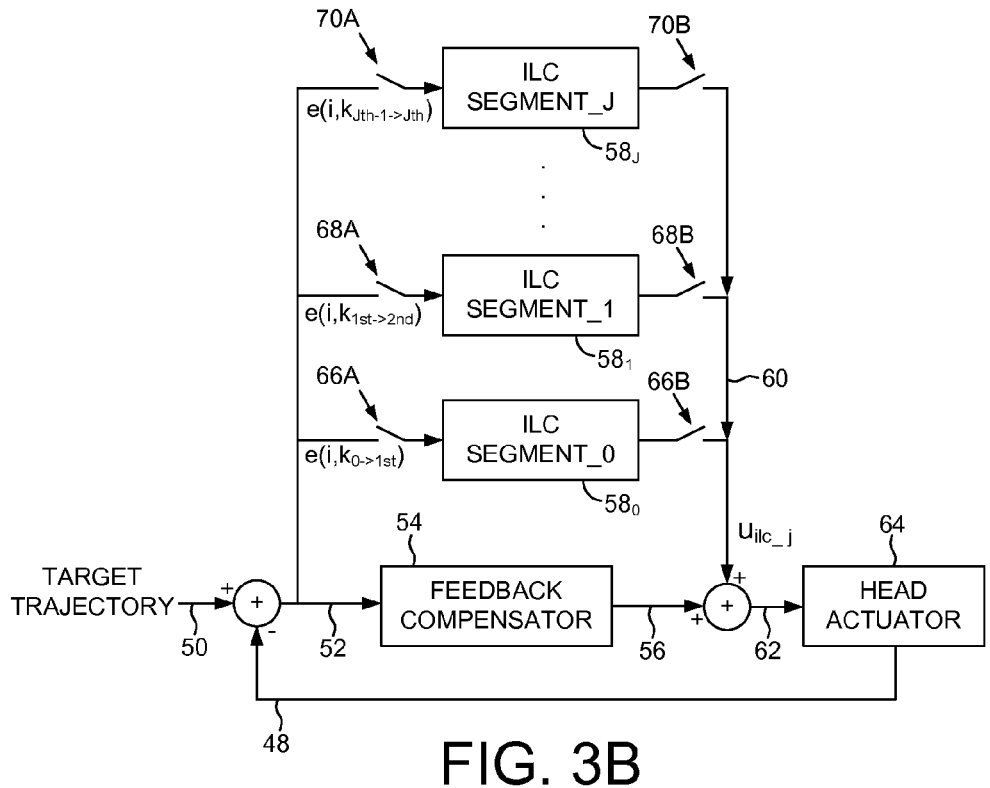
FIG. 3B
$u_{ilc\_j}(i+1,k-2) = u_{ilc\_j}(i,k-2) + K_p e(i,k)$ with $j = 0,\ldots,J$ ; $i = 0,\ldots,I_M$ ; $k = k_j,\ldots,k_{j+1}-1$
FIG. 3C
$u_{ilc\_j}(i+1,k-2) = u_{ilc\_j}(i,k-2) + K_{pj} e(i,k)$ with $j = 0,\ldots,J$ ; $i = 0,\ldots,I_M$ ; $k = k_j,\ldots,k_{j+1}-1$
FIG. 3D
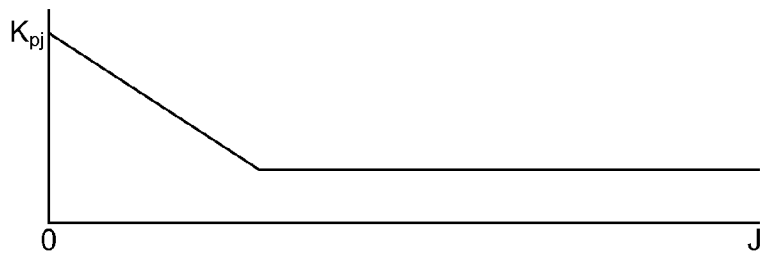
FIG. 3E $$\Delta r = \frac{v_f T}{N} * \frac{v_s}{v_s + v_f} \quad \text{and} \quad \Delta t = \frac{\Delta r}{v_s}$$

DISK DRIVE ADAPTING FEED-FORWARD COMPENSATION USING ITERATIVE LEARNING CONTROL OVER SEGMENTS OF SEEK LENGTH

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (A,B,C,D in the example shown), which are recorded with precise intervals and offsets relative to the servo track centerlines. The servo bursts 14 provide fine head position information used for centerline tracking while accessing a data track during write/read operations.

BRIEF DESCRIPTION OF THE DRAWINGS

FIG. 2A shows a disk drive according to an embodiment of the present invention for servo writing spiral servo tracks.

FIG. 2B shows a servo control system according to an embodiment of the present invention comprising an iterative learning control (ILC) feed-forward controller.

FIG. 2C is a flow diagram according to an embodiment of the present invention wherein the feed-forward compensation values are adapted by the ILC feed-forward controller over segments of a seek length.

FIG. 2D illustrates first and second segments of a seek length, wherein the feed-forward compensation values are adapted by the ILC feed-forward controller for the first segment, and then those feed-forward compensation values are used while adapting the feed-forward compensation values for the second segment according to an embodiment of the present invention.

FIG. 3A shows an embodiment of the present invention wherein the seek length is divided into J segments according to an embodiment of the present invention.

FIG. 3B illustrates the sequential aspect of adapting the feed-forward compensation values for each segment of the seek length according to an embodiment of the present invention.

FIG. 3C shows an equation implemented by the ILC feed-forward controller for adapting the feed-forward compensation values according to an embodiment of the present invention.

FIGS. 3D and 3E illustrate an embodiment of the present invention wherein a gain for the ILC equation is selected for each segment of the seek length, and in the embodiment shown, the gain decreases to a steady state value as the segment number increases.

DETAILED DESCRIPTION

Figure 1:
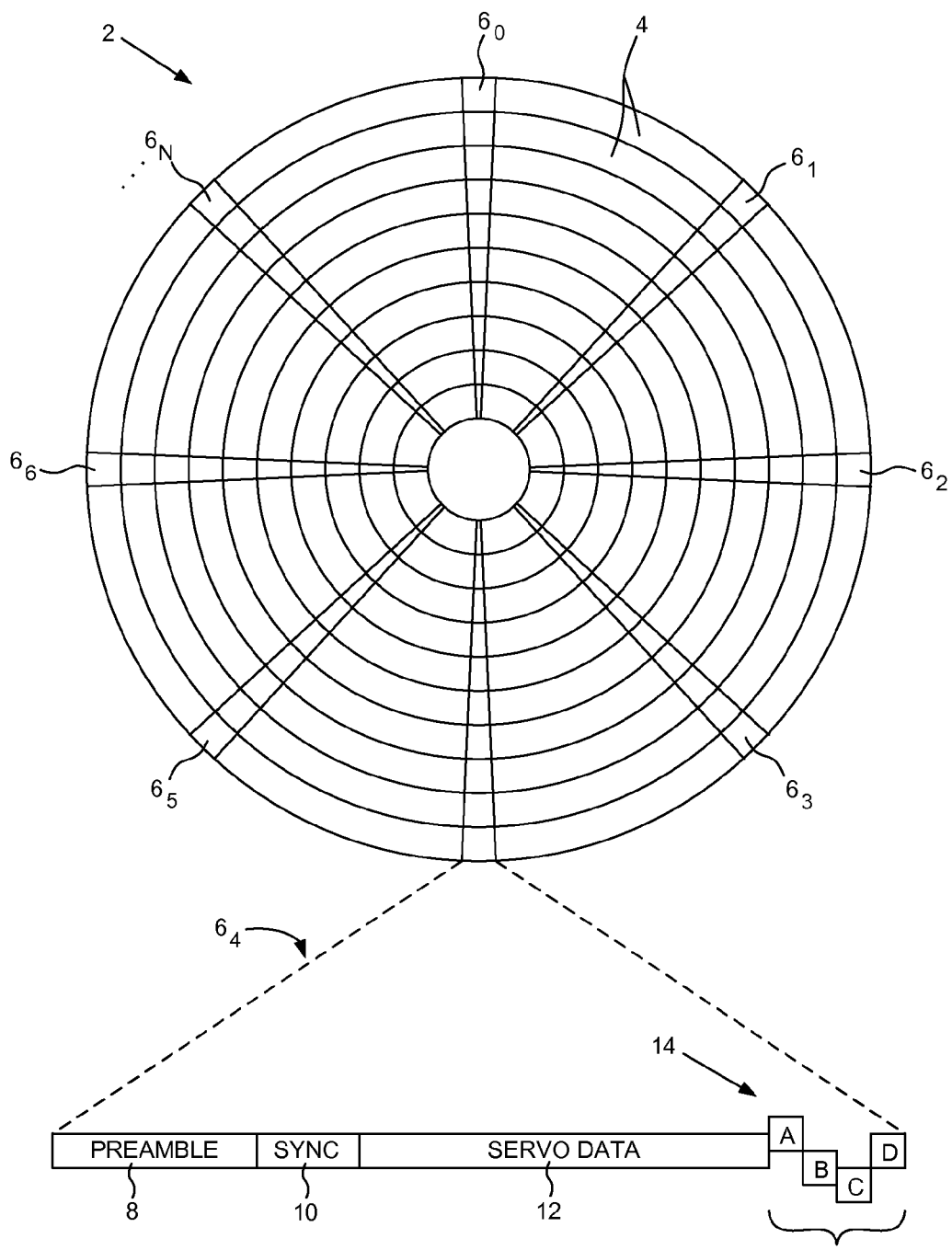
FIG. 1 shows a prior art disk format comprising a plurality of servo tracks defined by concentric servo sectors.

FIG. 2A shows a disk drive according to an embodiment of the present invention comprising a head 16 actuated over a disk 18 comprising servo information, and control circuitry 22 comprising a servo control system (FIG. 2B) operable to actuate the head 16 over the disk 18 in response to servo information. The servo control system is operable to execute the flow diagram shown in FIG. 2C, wherein a position error signal is generated while executing a first plurality of seek operations to seek the head over a seek length, and first feed-forward compensation values are adapted for a first segment of the seek length using an iterative learning control algorithm based on the position error signal generated over the first segment during the first plurality of seek operations (block 42). The position error signal is then generated while executing a second plurality of seek operations to seek the head over the seek length, and second feed-forward compensation values are adapted for a second segment of the seek length using the iterative learning control algorithm based on the position error signal generated over the second segment during the second plurality of seek operations (block 44), wherein the servo control system is operable to execute the second plurality of seek operations using the first feed-forward compensation generated for the first segment of the seek length.

In the embodiments of the present invention, any suitable servo information may be recorded on the disk 18 and processed during the seek operations using the iterative learning control algorithm. In one embodiment, the servo information is used to seek the head over the disk during normal operations (write/read operations). For example, the servo information may comprise concentric servo sectors as shown in FIG. 1, wherein the servo bursts may comprise any suitable pattern, such as an amplitude or phased based servo pattern. In another embodiment described below with reference to FIG. 4A, the servo information may comprise spiral seed tracks (e.g., spiral seed track $20_0$) and the head 16 may be servoed over the disk 18 while writing spiral servo tracks (e.g., spiral servo track $26_0$). The spiral servo tracks may be considered the final servo information used during normal operation, or the spiral servo tracks may be further processed to servo write concentric servo tracks to the disk.

In the embodiment of FIG. 2A, the seek length corresponds to seeking the head 16 from the OD to the ID of the disk 18 while writing a spiral servo track (e.g., spiral servo track $26_0$).

FIG. 2D shows an embodiment wherein the seek length is divided into two segments; however, the seek length may be divided into any suitable number of segments (e.g., J segments as shown in FIG. 3A). In one embodiment, the servo control system (FIG. 2B) adapts the feed-forward compensation values for the first segment at the beginning of the seek length, and then adapts the feed-forward compensation values for the next segment while applying the feed-forward compensation for the first segment, and so on until the feed-forward compensation values have been adapted for all of the segments.

The servo control system shown in the embodiment of FIG. 2B compares a measured position of the head 48 to a target trajectory 50 in order to generate a position error signal e(i,k) 52, where i represents the current seek iteration and k represents the current servo sample along the seek length. The position error signal 52 is processed by any suitable feedback compensator 54 (e.g., a proportional-integral-derivative compensator) to generate a feedback control signal 56. The position error signal 52 is also processed by an iterative learning control (ILC) feed-forward compensator 58 to generate the feed-forward compensation values $u_{ilc\_j}$ 60, where j represents the current seek length segment. The feed-forward compensation values 60 are used to adjust the feedback control signal 56 to generate a control signal 62 applied to a suitable head actuator 64 (such as the VCM 38 shown in FIG. 2A).

FIGS. 3A-3C illustrate an embodiment of the present invention wherein the seek length is divided into J segments. When adapting the feed-forward compensation values 60 for the first segment (SEGMENT_0), switches 66A and 66B are closed and switches 68A, 68B, 70A and 70B are opened. The servo control system then performs a first seek (i=0) and adapts the feed-forward compensation values 60 for the first segment using ILC SEGMENT_0 $58_0$ (i.e., execute the equation of FIG. 3C using the position error signal e for k=0 to k=end of $1^{st}$ segment). The servo control system performs multiple seeks (i=0 to i=M) while continuing to adapt the feed-forward compensation values 60 for the first segment. In an alternative embodiment, the number of seeks may terminate based on any suitable metric, such as the derivative of the feed-forward compensation values 60 falling below a threshold, or the average position error signal falling below a threshold (i.e., until the feed-forward compensation values converge).

After adapting the feed-forward compensation values 60 for the first segment, switch 66A is opened and switches 68A and 68B are closed. The servo control system then performs a first seek (i=0) and adapts the feed-forward compensation values 60 for the second segment using ILC SEGMENT_1 $58_1$ (i.e., execute the equation of FIG. 3C using the position error signal e for k=start of $2^{nd}$ segment to k=end of $2^{nd}$ segment). During the first part of the seek (k=0 to end of $1^{st}$ segment), switch 66B is closed and the feed-forward compensation values 60 for the first segment are used to adjust the feedback control signal 56. The servo control system performs multiple seeks (i=0 to i=M) while continuing to adapt the feed-forward compensation values 60 for the second segment.

The above process is repeated for each segment of the seek length until the feed-forward compensation values 60 have been adapted for the last segment (SEGMENT_J). In one embodiment, the feed-forward compensation values 60 for a previously adapted segment may be further adapted while adapting the feed-forward compensation values 60 for the following segments. For example, when adapting the feed-forward compensation values 60 for the second segment (SEGMENT_1), switch 66A may remain closed during the first part of the seek (k=0 to end of $1^{st}$ segment) in order to further adapt the feed-forward compensation values 60 for the first segment (SEGMENT_0).

In one embodiment, after the feed-forward compensation values 60 have been adapted for all of the segments, the switches 66A, 68A and 70A are opened and switches 66B, 68B and 70B are closed in sequence during subsequent seeks (e.g., while servo writing spiral servo tracks). That is, in this embodiment the feed-forward compensation values 60 are not adapted during normal seek operations. In an alternative embodiment, the feed-forward compensation values 60 may be further adapted during normal seek operations by closing switches 66A, 68A and 70A in sequence. In yet another embodiment, adapting of the feed-forward compensation values 60 may be enabled periodically in order to compensate for changes in environmental conditions, such as changes in temperature.

In one embodiment, the adapted feed-forward compensation values 60 may be stored as raw values in a lookup table and indexed by the servo sample index k during seek operations. In an alternative embodiment, the raw values of the adapted feed-forward compensation values may be generated during a seek operation using any suitable function, such as a suitable polynomial. In the embodiment wherein the feed-forward compensation values are adapted during normal operation, the raw values may be used to update the function (e.g., coefficients of a polynomial) used to generate the updated feed-forward compensation values.

In the embodiment of FIG. 3C, the ILC equation for adapting the feed-forward compensation values comprises a gain Kp that controls the learning speed of the ILC algorithm. In one embodiment, the gain Kp is constant while adapting the feed-forward compensation values for each segment of the seek length. In another embodiment illustrated in FIG. 3D, the gain Kpj may be different between at least two of the segments (indexed by j). FIG. 3E illustrates an embodiment wherein the gain Kpj of the learning coefficient is maximum for the first segment (j=0), and then ramps down to a steady state value for the subsequent segments. That is, the ILC algorithm is configured to adapt faster during the initial segments of the seek length, and then ramp down toward the constant value.

Figure 4A:
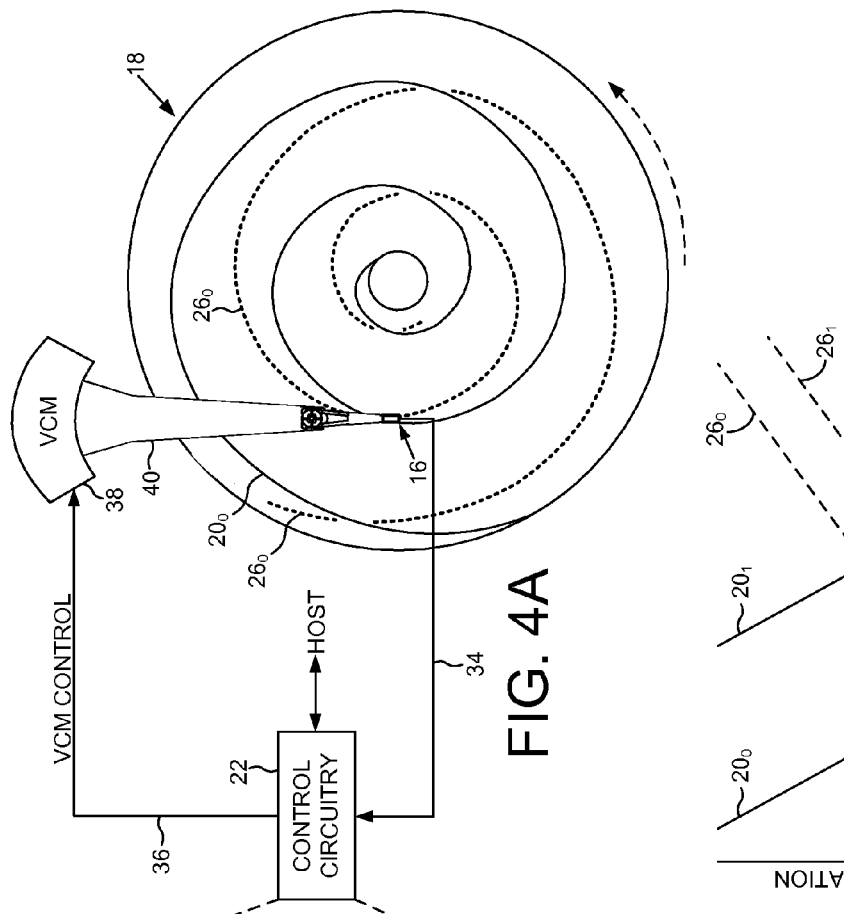
FIG. 4A shows a disk drive according to an embodiment of the present invention comprising a head actuated over a disk.
Figure 4B:
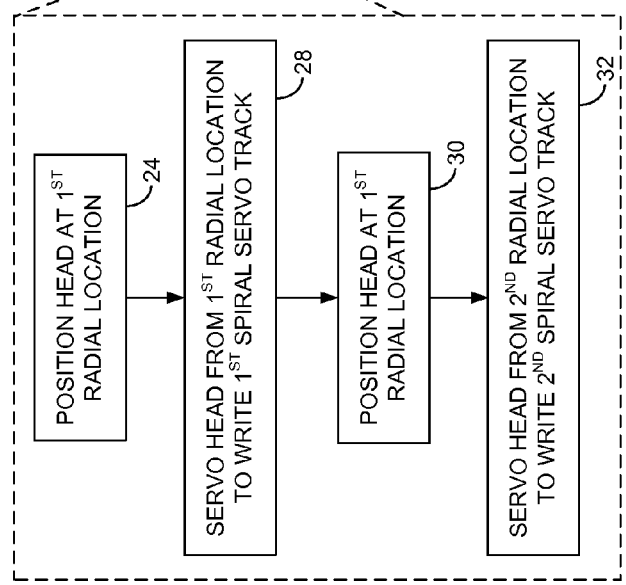
FIG. 4B is a flow diagram according to an embodiment of the present invention wherein a plurality of spiral servo tracks are written at a different starting radial location in order to achieve a consistent trajectory and spacing across the spiral servo tracks.
Figure 4C:
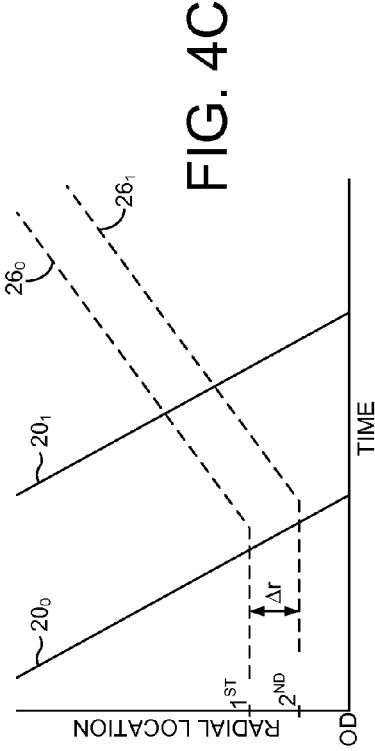
FIG. 4C illustrates an embodiment wherein first and second spiral servo tracks are written with a radial offset.

FIG. 4A shows a disk drive according to an embodiment of the present invention comprising a head 16 actuated over a disk 18 comprising a plurality of spiral seed tracks (e.g., spiral seed track $20_0$). The control circuitry 22 is operable to execute the flow diagram of FIG. 4B, wherein the head is positioned at a first radial location over the disk (block 24), and the head is servoed over the disk in response to the spiral seed tracks starting from the first radial location in order to write a first spiral servo track $26_0$ on the disk (block 28). The head is positioned at a second radial location over the disk different from the first radial location (block 30), and the head is servoed over the disk in response to the spiral seed tracks starting from the second radial location in order to write a second spiral servo track $26_1$ on the disk (block 32). An example of this embodiment is illustrated in FIG. 4C wherein there is a radial offset Δr between the first and second spiral servo tracks $26_0$ and $26_1$ which are written while servoing on spiral seed tracks $20_0$ and $20_1$.

Any suitable spiral seed tracks may be employed in the embodiments of the present invention. In the embodiment shown in FIGS. 4A and 4C, each spiral seed track (e.g., spiral seed track $20_0$) is written to the disk while moving the head radially across the disk from the inner diameter (ID) toward the outer diameter (OD). In the example of FIG. 4A, only one spiral seed track $20_0$ is shown for clarity, but in other embodiments there are at least two spiral seed tracks. Each spiral seed track may comprise any suitable pattern, wherein in one embodiment each spiral seed track comprises a high frequency pattern interrupted at a periodic interval by a sync mark. The head may be servoed radially over the disk in response to the spiral seed tracks in any suitable manner, such as by detecting a radial shift in the demodulated high frequency pattern relative to the sync marks.

In the embodiment shown in FIG. 4A, each spiral servo track (e.g., spiral servo track $26_0$) is written while moving the head radially across the disk from the OD to the ID. When the head 16 is about to cross over a spiral seed track, the writing of the spiral servo track is paused in order to read and demodulate the spiral seed track into the servo state information used to maintain the head along a desired trajectory while writing the spiral servo track. In one embodiment, the control circuitry 22 demodulates the read signal 34 emanating from the head while crossing a spiral seed track into a suitable servo state (e.g., position, velocity, etc.). The servo states are processed using a suitable compensator in order to generate a control signal 36 applied to a voice coil motor (VCM) 38 which rotates an actuator arm 40 about a pivot in order to move the head radially over the disk while writing the spiral servo track (e.g., spiral servo track $26_0$).

The spiral seed tracks (e.g., spiral seed track $20_0$) may be written to the disk in any suitable manner. In one embodiment, the spiral seed tracks may be written to a plurality of disks using a media writer, or the spiral seed tracks may be stamped or etched onto each disk using any suitable technique, prior to inserting each disk into a disk drive. In another embodiment, the spiral seed tracks may be written by an external servo writer after inserting each disk into a disk drive. In yet another embodiment, the spiral seed tracks may be self-servo written by the control circuitry 22 within each disk drive after inserting each disk into the disk drive. For example, a seek profile may be calibrated relative to an ID and OD crash stop (or ramp), and the calibrated seek profile used to write each spiral seed track to the disk.

Regardless as to how the spiral seed tracks are written to the disk, in one embodiment the spiral seed tracks are processed in order to servo the head over the disk while writing the spiral servo tracks. In one embodiment, the spiral servo tracks may be used to define the data tracks during normal operation of the disk drive (i.e., instead of writing concentric servo sectors as shown in FIG. 1). In another embodiment, the spiral servo tracks may be processed in order to servo the head over the disk while writing concentric servo sectors on the disk in order to define a final set of concentric servo tracks similar to FIG. 1. Regardless as to whether the spiral servo tracks define the final servo tracks, or whether the spiral servo tracks are used to write concentric servo sectors, it is desirable to write the spiral servo tracks in a consistent manner in order to minimize the difference between the trajectories as well as maintain a consistent spacing between the spiral servo tracks.

Figures 5A, 5B:
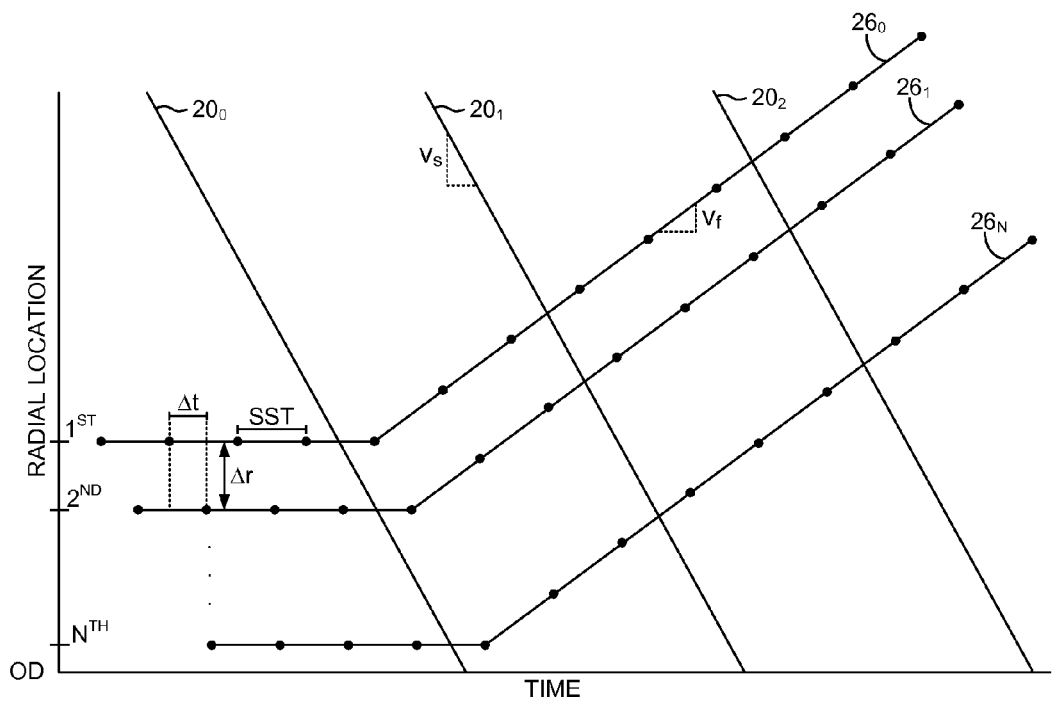
FIG. 5A illustrates an embodiment wherein first and second spiral servo tracks are written with a radial offset and with a shift in the servo sample time in order to achieve a substantially consistent servo sampling relative to spiral seed tracks.
FIG. 5B shows equations for computing the radial offset between spiral servo tracks and the shift in the servo sample time between spiral servo tracks according to an embodiment of the present invention.

FIG. 5A shows an embodiment of the present invention which improves the consistency of the spiral servo tracks by writing each spiral servo track with a predetermined radial offset as well as by shifting a servo sample time (i.e., shift a phase of the servo sample rate). The servo sample rate defines the rate at which at least one servo state is updated while servoing the head in response to the spiral seed tracks. In the example shown in FIG. 5A, the servo samples are represented as black dots along the trajectory of the spiral servo tracks, wherein the time between consecutive dots represents the servo sample period (servo sample time or SST). In one embodiment, writing each spiral servo track with a radial offset $\Delta r$ and shifting the servo sample time by a time offset $\Delta t$, aligns the servo samples relative to the spiral seed tracks as shown in FIG. 5A. For example, in FIG. 5A the head crosses the first spiral seed track $20_0$ between the fourth and fifth servo samples when writing all of the spiral servo tracks due to the radial offset $\Delta r$ and the time offset $\Delta t$. Accordingly, the difference between the radial locations (radial offset $\Delta r$) and the shift of the servo sample time (time offset $\Delta t$) results in a substantially consistent servo sampling relative to the spiral seed tracks.

FIG. 5B shows equations according to an embodiment of the present invention for computing the radial offset $\Delta r$ and the time offset $\Delta t$ that is introduced between the writing of each spiral servo track. In the equations shown in FIG. 5B, $\Delta r$ represents the difference between the first and second radial locations (the radial offset), $v_f$ represents a velocity of the head while writing the spiral servo tracks, T represents a number of servo samples in a revolution of the disk, N represents a number of spiral servo tracks written to the disk, and $v_s$ represents a velocity of a trajectory of the spiral seed tracks. The variables $v_s$ and $v_f$ are represented graphically in FIG. 5B as the slope of the spiral seed tracks and the slope of the spiral servo tracks, respectively.

In one embodiment, writing the spiral servo tracks with a radial offset $\Delta r$ and a shift of the servo sample time (time offset $\Delta t$) in order to achieve a substantially consistent servo sampling relative to the spiral seed tracks improves the performance of the servo control system, thereby resulting in more consistent spiral servo tracks (trajectory and spacing). For example, in the embodiment where the servo control system executes an iterative learning control algorithm as described above, the servo control system may need only learn the feed-forward compensation values relative to the trajectory of a first spiral servo track. When writing the subsequent spiral servo tracks, the same feed-forward compensation values may be used by the servo control system since there is a consistent servo sampling relative to the spiral seed tracks (due to the radial offset $\Delta r$ and time offset $\Delta t$ between the spiral servo tracks). As described above, the feed-forward compensation values may be further adapted while writing the subsequent spiral servo tracks, but the initial learning is performed prior to writing the first spiral servo track.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising servo information;
a head; and
control circuitry comprising a servo control system operable to actuate the head over the disk in response to the servo information, the servo control system operable to:
generate a position error signal while executing a first plurality of seek operations to seek the head over a seek length, and adapt first feed-forward compensation values for a first segment of the seek length using an iterative learning control algorithm based on the position error signal generated over the first segment during the first plurality of seek operations; and
generate the position error signal while executing a second plurality of seek operations to seek the head over the seek length, and adapt second feed-forward compensation values for a second segment of the seek length using the iterative learning control algorithm based on the position error signal generated over the second segment during the second plurality of seek operations;
wherein the servo control system is operable to execute the second plurality of seek operations using the first feed-forward compensation values generated for the first segment of the seek length without adapting the first feed-forward compensation values using the iterative learning control algorithm based on the position error signal generated over the first segment during the second plurality of seek operations.

2. The disk drive as recited in claim 1, wherein the servo information comprises a plurality of concentric servo sectors extending across substantially an entire radius of the disk.

3. The disk drive as recited in claim 1, wherein the servo information comprises a plurality of spiral tracks extending across substantially an entire radius of the disk.

4. The disk drive as recited in claim 1, wherein the servo control system is operable to adapt the first and second feed-forward compensation values according to:

$$u_{ilc\_j}(i+1,k-2) = u_{ilc}(i,k-2) + K_p e(i,k), \text{with } i=0, \ldots, I_j, \text{ and } k = k_j, \ldots, k_{j+1}-1$$

where:
j represents one of the first and second segments of the seek length;
i represents a seek index for a current seek operation out of one of the first and second plurality $I_j$ of seek operations;
k represents an index of the position error signal generated over one of the first and second segments of the seek length;
e(i,k) represents the position error signal;
$u_{ilc\_j}$ represents one of the first and second feed-forward compensation values; and
$K_p$ represents a gain of the iterative learning control algorithm.

5. The disk drive as recited in claim 1, wherein the servo control system is operable to adapt the first and second feed-forward compensation values according to:

$$u_{ilc\_j}(i+1,k-2) = u_{ilc}(i,k-2) + K_{pj} e(i,k), \text{with } i=0, \ldots, I_j, \text{ and } k = k_j, \ldots, k_{j+1}-1$$

where:
j represents one of the first and second segments of the seek length;
i represents a seek index for a current seek operation out of one of the first and second plurality $I_j$ of seek operations;
k represents an index of the position error signal generated over one of the first and second segments of the seek length;
e(i,k) represents the position error signal;
$u_{ilc\_j}$ represents one of the first and second feed-forward compensation values; and
$K_{pj}$ represents a gain of the iterative learning control algorithm corresponding to one of the first and second segments of the seek length.

6. The disk drive as recited in claim 5, wherein $K_{pj}$ for the first segment is different than $K_{pj}$ for the second segment.

7. The disk drive as recited in claim 6, wherein $K_{pj}$ for the first segment is greater than $K_{pj}$ for the second segment.

8. The disk drive as recited in claim 7, wherein the first segment precedes the second segment.

9. The disk drive as recited in claim 1, wherein the servo control system is operable to adapt the first feed-forward compensation values over the first plurality of seek operations until the first feed-forward compensation values converge.

10. The disk drive as recited in claim 9, wherein the first feed-forward compensation values converge when an average position error signal over the first segment falls below a threshold.

11. A method of operating a disk drive comprising a head actuated over a disk comprising servo information, and a servo control system operable to actuate the head over the disk in response to the servo information, the method comprising:
generating a position error signal while executing a first plurality of seek operations to seek the head over a seek length, and adapting first feed-forward compensation values for a first segment of the seek length using an iterative learning control algorithm based on the position error signal generated over the first segment during the first plurality of seek operations; and
generating the position error signal while executing a second plurality of seek operations to seek the head over the seek length, and adapting second feed-forward compensation values for a second segment of the seek length using the iterative learning control algorithm based on the position error signal generated over the second segment during the second plurality of seek operations;
wherein the servo control system is operable to execute the second plurality of seek operations using the first feed-forward compensation values generated for the first segment of the seek length without adapting the first feed-forward compensation values using the iterative learning control algorithm based on the position error signal generated over the first segment during the second plurality of seek operations.

12. The method as recited in claim 11, wherein the servo information comprises a plurality of concentric servo sectors extending across substantially an entire radius of the disk.

13. The method as recited in claim 11, wherein the servo information comprises a plurality of spiral tracks extending across substantially an entire radius of the disk.

14. The method as recited in claim 11, wherein the first and second feed-forward compensation values are adapted according to:

$$u_{ilc\_j}(i+1,k-2) = u_{ilc}(i,k-2) + K_p e(i,k), \text{with } i=0, \ldots, I_j, \text{ and } k = k_j, \ldots, k_{j+1}-1$$

where:
j represents one of the first and second segments of the seek length;

i represents a seek index for a current seek operation out of one of the first and second plurality $I_j$ of seek operations;

k represents an index of the position error signal generated over one of the first and second segments of the seek length;

e(i,k) represents the position error signal;

$u_{ilc\_j}$ represents one of the first and second feed-forward compensation values; and $K_p$ represents a gain of the iterative learning control algorithm.

15. The method as recited in claim 11, wherein the first and second feed-forward compensation values are adapted according to:

$$u_{ilc\_j}(i+1,k-2)=u_{ilc}(i,k-2)+K_{pj}e(i,k), \text{with } i=0,\ldots,J_j, \text{ and } k=k_j,\ldots,k_{j+1}-1$$

where:

j represents one of the first and second segments of the seek length;

i represents a seek index for a current seek operation out of one of the first and second plurality $I_j$ of seek operations;

k represents an index of the position error signal generated over one of the first and second segments of the seek length;

e(i,k) represents the position error signal;

$u_{ilc\_j}$ represents one of the first and second feed-forward compensation values; and $K_{pj}$ represents a gain of the iterative learning control algorithm corresponding to one of the first and second segments of the seek length.

16. The method as recited in claim 15, wherein $K_{pj}$ for the first segment is different than $K_{pj}$ for the second segment.

17. The method as recited in claim 16, wherein $K_{pj}$ for the first segment is greater than $K_{pj}$ for the second segment.

18. The method as recited in claim 17, wherein the first segment precedes the second segment.

19. The method as recited in claim 11, further comprising adapting the first feed-forward compensation values over the first plurality of seek operations until the first feed-forward compensation values converge.

20. The method as recited in claim 19, wherein the first feed-forward compensation values converge when an average position error signal over the first segment falls below a threshold.

* * * * *